Patented Aug. 11, 1953

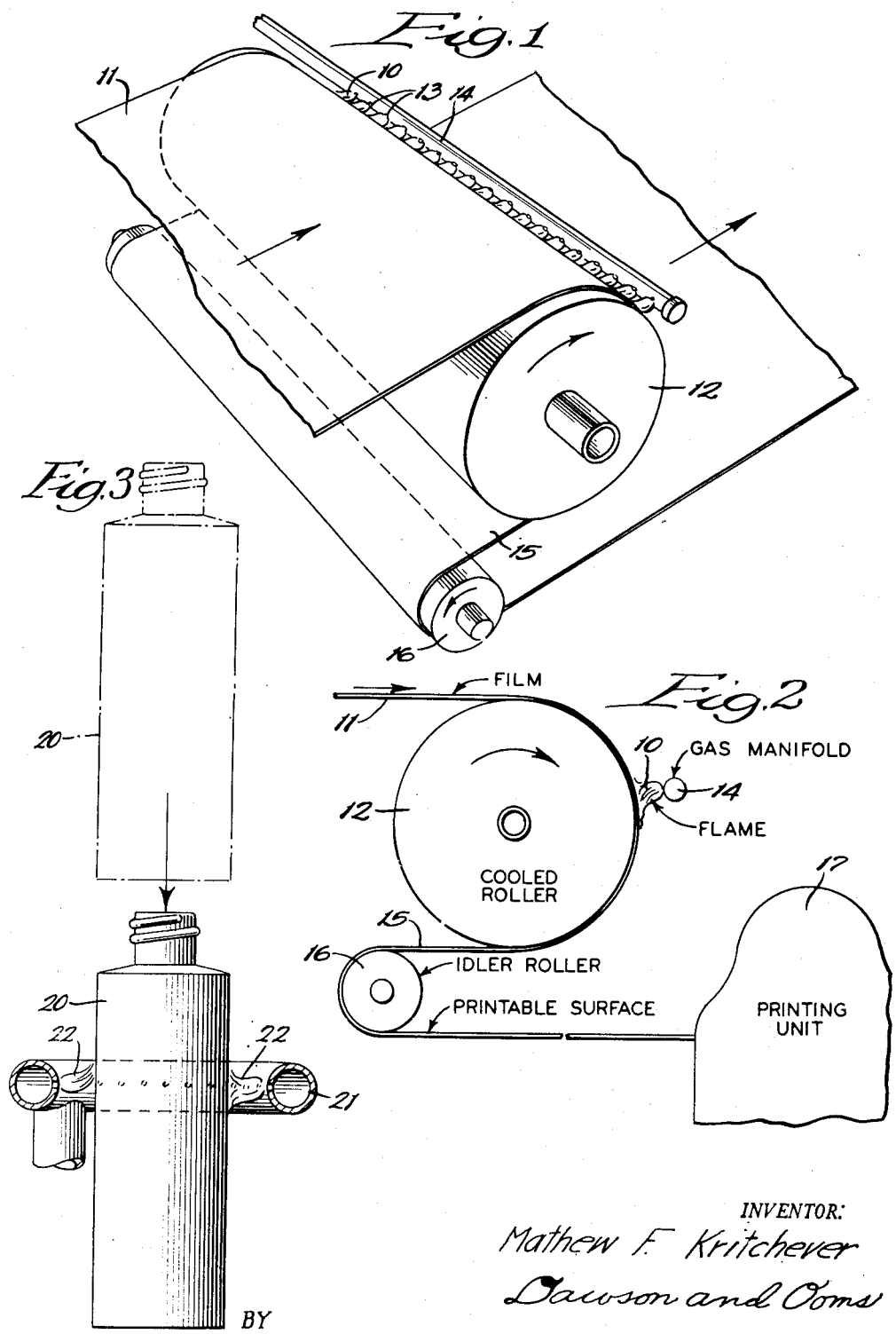

2,648,097

UNITED STATES PATENT OFFICE 2,648,097

METHOD OF SECURING DECORATIVE MATTER TO A SURFACE OF A POLYETHYLENE BODY

Mathew F. Kritchever, Wilmette, Ill., assignor to Traver Corporation, Chicago, Ill., a corporation of Illinois Application April 4, 1952, Serial No. 280,583

2 Claims. (Cl. 18—47.5)

This invention relates to the manufacture of a printable surface on resinous films and plastic materials which have heretofore been considered unreceptive to coating compositions such as to obviate satisfactory printing or coating thereof.

The present application is a continuation-in-part of my co-pending application, Serial No. 150,414, for Treating Polyethylene Plastics For Printing, filed March 18, 1950.

In most respects, anchorage of the printing or coating compositions on various types of surfaces depends upon some type of physical or chemical bond existing between the coating or printing compositions and the surfaces upon which they are to be applied. When printing on paper or other porous surfaces, anchorage of the printing ink or coating composition is achieved by partial impregnation and infiltration of the composition into the pores of the fibrous structure which enables the development of a firm gripping relation with the surface in a type of physical interlocking. When printing or coating onto smoother surfaces, such as plastic, glass or the like, reliance is usually had upon a physicochemical bond, such as softening of the material on the plastic surfaces to be printed, as by means of a mutual solvent, to make possible a type of integration of one material with the other.

With a material such as polyethylene, the possibilities for anchorage in the usual manner are substantially absent. This is especially true with polyethylene plastics, the molecules of which have been orientated by stretching while in plastic condition and then setting as in the manufacture of film or sheet stock. The difficulties with printing on polyethylene surfaces apparently arise from the smoothness of the surfaces, which militates against purely physical anchorage, and the inertness of the resinous polymers which militates against development of a bond through the technique of eating into the surfaces to be printed by solvents or the like, usually embodied in the printing or coating composition.

In view of the increasing use of polyethylene in the form of film, sheet stock, or containers for packaging, it becomes important to provide a system which permits printing thereon, on a mass production basis, characteristic of modern packaging technique. It is an object of this invention to overcome the difficulties of printing or coating onto polyethylene.

In accordance with this invention, a surface highly receptive to the common ink and coating compositions is developed on polyethylene by directing a gas flame onto the surfaces to be printed for a relatively short time without raising the mass of the plastic to a temperature enabling distortion. If the plastic material is in the form of a film of thin sheet stock, it is expedient to direct the flame onto the surfaces of the plastic while the opposite wall is being cooled. If the flame directed onto the plastic surfaces is in excess of 1300° F., preferably within the range of 1300°–1600° F., almost instantaneous conversion to a highly ink-receptive surface is secured. If lower temperatures are employed, it may be necessary to prolong the flame treatment or to provide successive treatments, keeping in mind that the plastic should not be heated through to a temperature permitting plastic flow. In any event it is seldom that more than a second or a fraction of a second is required.

At present, beneficial results have been only achieved by direct contact of a flame with the plastic surface. For purposes of illustration but not of limitation, apparatus for carrying out this invention by means of a gas flame will hereinafter be described in connection with the accompanying drawing in which—

Figure 1 is a perspective plan view of apparatus for carrying out the invention on plastic film stock; Figure 2 is a sectional elevational view of the arrangement of elements shown in Figure 1; and Figure 3 is a sectional elevational view which schematically shows the technique for carrying out the invention on an already formed plastic container.

As shown in Figures 1 and 2 of the drawing, a gas flame 10 is directed onto a surface of a film 11 of polyethylene while the opposite surface is being cooled as the film passes over a water-cooled roller 12. The flame 12 is generated by gas which flows from a plurality of spaced orifices 13 in a manifold 14. In the alternative, gas may be supplied from an elongated slot across the orifice to provide an endless flame. In the event that the temperature of the flame directed onto the outer wall of the plastic film is below that capable of effecting the desired conversion to a printable surface by instantaneous contact, the speed of the roller or the travel of the web may be slowed, but it should not be slowed to a rate which permits the flame to heat the plastic through to a temperature permitting distortion. In the event that the instantaneous contact of the flame is incapable of giving the desired result, it is better to provide a number of such manifolds to direct separate flames onto the surface of the film as it travels over the cooling roller 12, or to provide a plurality of such individual units for successive treatments of the type described. After the surface of the plastic film has been flame treated in the manner described, the surface of the plastic is thereafter highly receptive to ink and coating compositions ordinarily used in the printing and packaging trade. As a result the film can be processed immediately or any time thereafter in the usual manner in the printing trade. Without causing distortion in the body of the plastic or releasing the internal stresses of the plastic body, the surface is thus rendered permanently receptive or adherent to ink, coating compositions, or other decorative matter.

The flame treated plastic film 15 may be passed over one or more idler rollers 16 and then packaged for subsequent printing and use in the manner intended, or else it may be advanced directly to a printing unit 17 to ink the prepared printable surface.

In the present systems for molding or blowing plastic containers, such flame treatment prior to the formation of the container is practically impossible, and, after formation, treatment in a manner described for film and sheet stock is equally unavailable. It has been found, however, that concepts of this invention may be practiced with relatively thick sheet stock and plastic bodies, such as exist in molded and blown containers, by passage of a gas flame quickly over the surface to be printed without heating the mass of the plastic to a temperature permitting plastic flow.

As illustrated in Figure 3, a blown polyethylene bottle 20, with or without a coolant therein, may be dropped or passed through a ring manifold 21 for directing a flame 22 onto the surface of the plastic bottle as it passes therethrough. If a single passage is not sufficient to provide the desired printable surface on the bottle, the bottle may be passed through the flame more than one time or a series of such manifold flame-generating units may be provided in spaced-apart relation to effect such treatments in successive fashion. In the event that the plastic material is in the form of sheet stock, it may be passed over the flame or a flame may be passed over it without relying on contact of the opposite surface with some coolant, so long as the contact of the flame is insufficient to heat the plastic to flowable condition.

By this simple technique, I have succeeded in providing printable surfaces on plastic materials which have heretofore been unreceptive to ink or resinous coating compositions. The theory upon which the reaction may be based is not understood for the present. It might be that the flame treatment casues a type of rearrangement of the molecules which exist on the surface of the plastic whereby a new type of anchoring relation is permitted with the applied ink or coating composition. It might also be that some type of modification occurs in the molecules that exist on the resinous surface whereby a flame treated surface only becomes printable and receptive to coating composition. Whatever the reason, the results achieved indicate that a new relationship exists which makes these flame treated resinous materials and plastics more suitable in the packaging field because of the greater ease and permanence of printing with ordinary inks. As as result, it is unnecessary to provide an auxiliary wrapping to carry the necessary printed information, as is the practice for the present.

The heating of the surface or the impingement of the flame thereon apparently changes the structure of the surface polyethylene molecules to render them adherent to decorative matter, and the application of the heat or flame is discontinued before distortion of the interior of the polythylene body occurs and before the treated surface tends to flow or lose its contour. Upon cooling, the surface hardens and the hardened surface, having its original contour unmodified, is thus maintained permanently receptive and adherent to decorative matter.

Tests made upon the treated polyethylene body indicate that the surface polyethylene molecules are modified very substantially by the creation of double bonds. A relatively high degree of unsaturation of the surface polyethylene molecules is produced by the heat treatment, causing the surface to become now highly receptive to inks, pigments, adhesives, coating compositions, and other decorative matter. The surface is cooled to harden it in this condition, so that the unsaturated surface molecules continue permanently to be receptive to such added matter. The tests further show that should the heating be continued to the point that plastic flow of the treated surface is brought about and the contour of the surface modified, this receptive or adherent quality is lost. Flame treatment is, therefore, discontinued to avoid plastic flow, thereby maintaining the original contour of the article being treated.

Tests have been made to determine the effect of the flame treatment of a polyethylene film in comparison with a film which was not subjected to such treatment. In the tests, film A was an untreated control sample having a thickness of 1.3 mil. Film B was a thermally-treated film having a thickness of 2.25 mil. These films were run through a Beckman recording infrared spectrophotometer, with the results indicated below.

In the infrared study of chemical changes in polyethylene films, it is important to compare carefully the recorded trace of the test sample with that of the control. The most significant change noted in studying film B as compared to film A was the increase in the amount of $R_2C=CH_2$ groups. These groups are produced by the degradation of the long chains probably at points along the chain where the side branches are attached. Unsaturation is also tested quantitatively by measuring the weight of bromine vapor absorbed by the film in the dark. The bromine is pumped out of the film as much as possible after exposure (the length of exposure may be as long as several days), but for a surface treatment, a few minutes or hours is all that is required. Control experiments are carried out at the same time, using untreated samples.

Polyethylene does not oxidize at an appreciable rate when in the solid state unless activated by gamma rays, electron bombardment, etc. As a liquid, it will combine readily with oxygen, even if oxygen is present only in minute percentage in the gas to which the liquid polyethylene is exposed.

The tests upon film B not only gave evidence of the production of the C=O group at 5.9 $\mu$, but also some evidence of oxidation because of general increase of absorption between 8 and 10 $\mu$. There is a slight intensification of the $RCH=CH_2$ absorption band at 11.3 $\mu$, indicating production of double bonds.

The treatment of the film or other polyethylene body with flame very substantially increases the number of unsaturated linkages while also oxidizing the surface of the film. The heating is carried on to the point that a softening of the treated surface occurs, but the heating is discontinued before plastic flow is brought about causing a change of contour of the surface. Upon cooling, the hardened surface remains permanently receptive and strongly adherent to inks, pigments, adhesives, coating compositions, and other forms of decorative matter. Treating with flame is highly effective in bringing about the softening without plastic flow to produce the high receptivity required in that the flame supplies high heat for a brief moment and the period of physical contact is terminated before plastic flow of the surface occurs or distortion within the interior of the polyethylene body occurs. I find it advantageous to employ a flame having a temperature of from 1300 or 1600° F. up to 3600 or 3800° F. I prefer to employ a flame temperature in the neighborhood of 3600° F. because the period of exposure of the plastic surface to the flame can thus be considerably shortened.

The flame-treated product, whether it be a flame-treated polyethylene film or a relatively thick polyethylene body, is characterized by a very substantial increase in the number of double bonds. The unsaturated surface molecules produced by the flame treatment cause the surface, even when hardened, to maintain a high affinity for inks, pigments, and other forms of decorative matter.

It will be understood that numerous changes may be made in the details of handling, cooling, or applying the technique without departing from the spirit of the invention, especially as defined in the following claims.

I claim:

1. The method of securing decorative matter to a surface of a polyethylene body, which comprises passing said surface of said polyethylene body through a flame to immerse said surface within said flame to soften said surface without materially heating the rest of said body, then permitting said surface to harden and set to produce a surface permanently adherent to decorative matter.

2. The method of securing decorative matter to a surface of a polyethylene body, which comprises maintaining a flame having a temperature of from 1600° to 3800° F., passing said surface of said body through said flame to immerse said surface in said flame to an extent sufficient to soften said surface, withdrawing the surface of said body from said flame before materially heating the rest of said body, then permitting said surface and body to harden and become set to produce a surface permanently adherent to decorative matter, and thereafter at any time applying decorative matter to said permanently-receptive surface.

MATHEW F. KRITCHEVER.

No references cited.